Jan. 18, 1966 F. H. BURGESS ETAL 3,229,928

REEL

Filed April 24, 1964 2 Sheets-Sheet 1

INVENTORS
FRANK H. BURGESS
OTTO MORNINGSTAR
GREGORY MATHUS

BY, Ezekiel Wolf, Wolf & Greenfield
ATTORNEYS

Jan. 18, 1966 F. H. BURGESS ETAL 3,229,928

REEL

Filed April 24, 1964 2 Sheets-Sheet 2

INVENTORS:
FRANK H. BURGESS
OTTO MORNINGSTAR
GREGORY MATHUS
BY Ezekiel Wolf, Wolf & Greenfield
ATTORNEYS 3,229,928
REEL Frank H. Burgess, Somerset, and Otto Morningstar, Brookline, Mass., and Gregory Mathus, West Hartford, Conn., assignors, by mesne assignments, to Data Packaging Corp., Cambridge, Mass., a corporation of Massachusetts Filed Apr. 24, 1964, Ser. No. 362,343
16 Claims. (Cl. 242—71.8)

The invention relates to reels for storing tape and film. A very substantial load is applied to the hub of a tape reel when an appreciable length of tape is wound on it as is the practice with magnetic tape reels used on computer machines. Such a load may cause distortion of the reel hub which results in the uneven winding of the tape. When uneven winding occurs, the tape may fray against the reel flanges or it may be subjected to uneven stresses particularly when it is wound at high speeds, which may cause the tape to tear.

The industry has to a great extent adopted the use of reels made of plastic to store computer tape. The plastic reels have many advantages over the older metal reels for example, the flanges may be transparent so that the quantity of tape wound on a reel may be determined at a glance even when the machine is in operation; the plastic reels are less expensive to manufacture than the metal reels and may be distinctively styled; and the plastic reels are considerably lighter than comparable reels made of metal. However, the plastic reels do not have the strength of metal reels, and the plastic reel hubs cannot be machined to provide them with substantially perfect cylindrical forms.

Others have attempted to combine the attributes of plastic and metal in the manufacture of reels by making the hubs of metal and the flanges of plastic. By using aluminum for the reel hub, a greater strength to weight ratio is provided the load carrying part of the reel. Many problems are present, however, in combining metal and plastic in a unitary structure such as reels, due to the inequality of thermal expansion of the materials. The problems are compounded when the aluminum hub inner and outer surfaces are to be exposed, as it is then more difficult to secure the reel flanges to the metal hub.

One important object of this invention is to provide a reel having a metal hub upon which the tape may be directly wound and having plastic flanges which protect the edges of the tape.

Another important object of this invention is to combine in a reel a metal hub and plastic flanges, and minimize the transfer of stresses from one material to the other which would ordinarily result from the different thermal expansions of the two materials.

Yet another important object of this invention is to provide a reel made of a combination of metal and plastic parts, wherein all the critical surfaces are machined.

Still another important object of this invention is to provide a reel which may be assembled conveniently even when certain of the parts of the reel are secured together by a cement which sets very slowly.

To accomplish these and other objects this invention includes a reel composed of an aluminum hub and modified polystyrene plastic flanges. The hub cross section is made of an I-beam with the beam flanges forming the takeup surface for the tape and the inner hub surface which fits on the spindle of the machine on which the reel is used. The reel flanges made of a modified polystyrene are secured to the aluminum hub by an elastic cement which allows for the differential expansion of the two materials. While the plastic is secured to the aluminum by the elastic cement, the two flanges of the reel are secured directly together by a solvent quick drying cement.

These and other objects and features of this invention will be better understood and appreciated from the following detailed description of several embodiments thereof, selected for purposes of illustration and shown in the accompanying drawing, in which.

The embodiment of this invention shown in FIGS. 1–5 includes a reel hub 10 and a pair of reel flanges 12 and 14. These three parts make up the complete reel.

Figure 2:
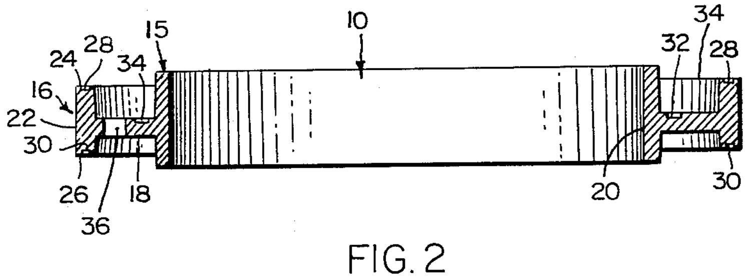
FIG. 2 is a cross-sectional view of the hub shown in FIG. 1.
Figure 4:
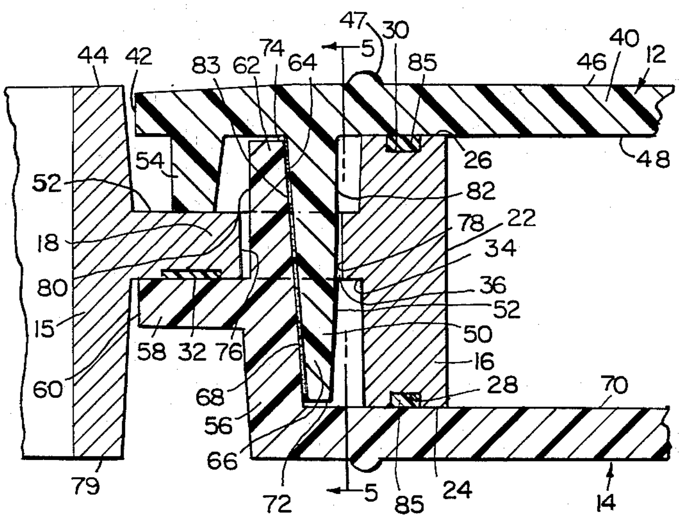
FIG. 4 is an enlarged cross-sectional view of a portion of the reel of FIG. 3.
Figure 3:
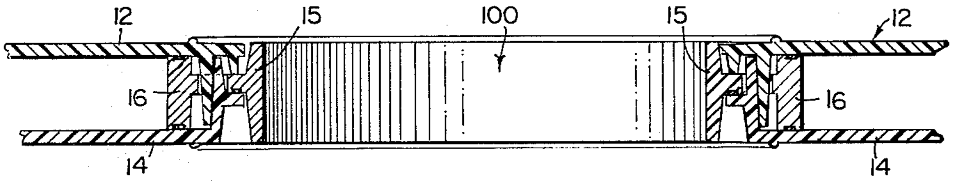
FIG. 3 is a cross-sectional view of a reel constructed in accordance with this invention and which includes the hub of FIGS. 1 and 2.

The reel hub 10 is shown in FIGS. 2–4 in cross section to bear the general shape of an I-beam having an inner flange 15 and an outer flange 16 connected together by web 18. The inner face 20 of the hub flange 15 preferably is a machined surface and is designed to fit on the spindle of a computer or other machine on which the reel is used. The outer face 22 of the hub flange 16 is perhaps the most critical part of the entire reel and is precisely machined. Tape stored on the reel is directly wound on the face 22, and the precision with which it is machined will determine the regularity or evenness of the turns of the tape wound on it. If the face 22 is anything but precisely cylindrical with respect to the axis of the spindle, the tape will wind unevenly on the hub.

The edges 24 and 26 of the outer hub flange 16 are provided with annular recesses 28 and 30 which preferably extend about the entire edges. The recesses 28 and 30 define wells in which a ribbon of cement may be applied to attach the reel flanges 12 and 14 to the hub. Another annular recess 32 is provided in surface 34 of the web 18 to receive a ribbon of cement used to secure the reel flange 14 to the hub. These recesses and the cement used, as well as other details relating to the securing together of the flanges and the hub, will be described in greater detail below.

Figure 1:
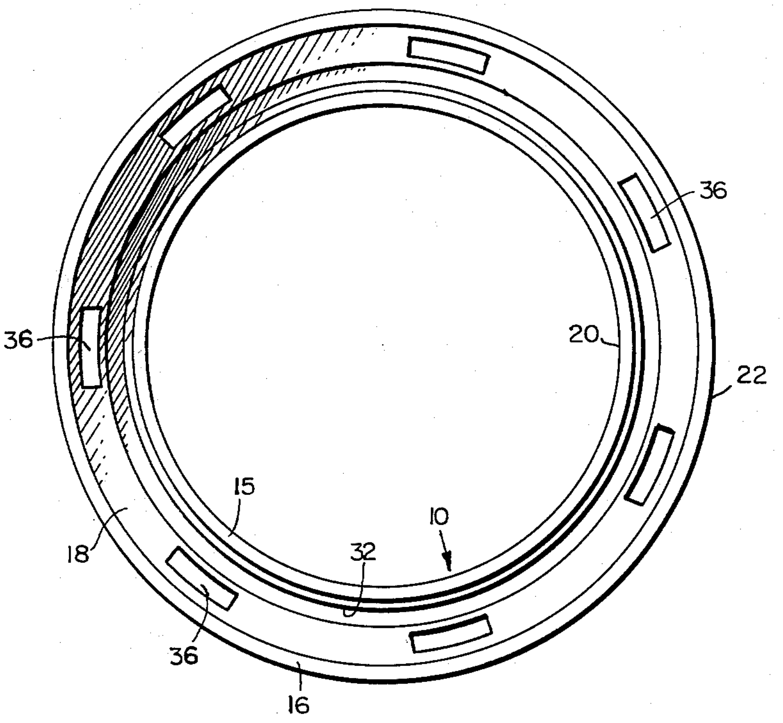
FIG. 1 is a plan view of a reel hub constructed in accordance with this invention.

In FIG. 1 a number of arcuate slots 36 are shown provided in the web 18 of the hub. In that figure seven such slots are shown but it is to be understood that more or fewer of such slots may be employed. These slots enable the two reel flanges 12 and 14 of the reel to be connected directly to one another as evident in FIG. 4.

In FIGS. 3 and 4 the reel flange 12 which ordinarily faces away from the machine spindle is shown composed of an annular plate 40 having an inner edge 42 that describes a diameter slightly larger than the outer diameter of the inner hub flange 15 measured adjacent its edge 44. The outer diameter of the flange 12 is determined by the size of the reel desired and does not in any way relate to the present invention. The outer surface 46 of the flange 12 may be flat and be provided with a bead 47 or other protrusions which serve primarily decorative purposes. Adjacent the inner edge 42, the flange 12 is somewhat offset so as to assure full exposure of the edge 44 of the inner hub flange 14. It is very desirable that the edge 44 of the flange 14 be exposed because certain machines use clamps to retain the reels on the spindles, and those clamps are designed to engage the outer face of the hub. If the surface 46 of the flange 12 protruded outwardly beyond the edge 44 of the hub flange 14, it would interfere with the action of the clamp.

Figure 5:
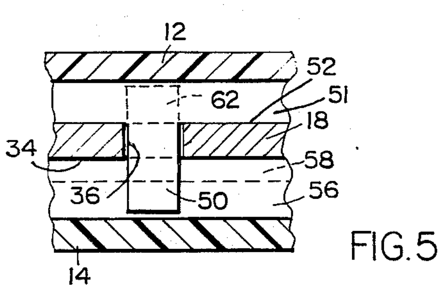
FIG. 5 is a cross-sectional view taken along the section line 5—5 of FIG. 4.

The inner surface 48 of the reel flange 12 carries a number of spaced tongues 50 which extend through the slots 36 when the reel flange 12 is mounted on the hub. Thus, the tongues 50 equal in number the slots 36 and are spaced about the inner surface 48 of the reel flange so as to mate with those slots. A shorter rib 51 may extend between the tongues 50, which rib 51 bears against the web surface 52 as shown in FIG. 5. The rib forms a continuation of the tongues 50 so as to define an unbroken annular wall on the inner surface 48 of the reel flange 12.

A second annular rib 54 is provided on the inner surface 48 of the reel flange 12 adjacent its inner edge 42, which rib 54 bears against the surface 52 of the web adjacent the inner hub flange 15. The rib 54 cooperates with the tongue 50 and other parts of the flange 12 to form a firm support for the reel flange 12 on the hub. It is evident in FIG. 4 that the inner surface 48 of the flange 12 abuts against the edge 26 of the outer hub flange 16 and covers the well 30. The thickness of the reel flange 12 at the edge 26 substantially equals the axial distance between the edge 26 and the edge 44 of the inner hub flange 15.

The reel flange 14 is somewhat different than the reel flange 12 and includes about its inner edge a step 56 which offsets the inner portion 58 of the flange 14 so that it abuts against the surface 34 of the hub web 18. The offset portion 58 overlies the recess 32 on the surface 34 and extends outwardly in a radial direction over a portion of the slot 36. This is evident from an inspection of FIG. 4. The inner edge 60 of the offset portion 58 which defines the inner diameter of the annular reel flange 14 is spaced from the outer surface of the inner hub flange 15 in the manner of the edge 42 of the other reel flange 12. This spacing of the parts has a definite function which is discussed in greater detail below.

The outer edge of the offset portion 58 of the reel flange 14 carries a plurality of tongues 62 that extend through the slots 36, and the tongues 62 equal in number the slots 36 and the tongues 50.

It will be noted in FIG. 4 that the ends 72 and 74 of the tongues 50 and 62, respectively, terminate just short of the inner surfaces 48 and 70 so that they do not interfere with one another when the reel flanges 12 and 14 are assembled on the hub 10. It is also evident in FIG. 4 that the inner and outer edges 76 and 78 of the slots 36 are spaced from the inner face 80 of the tongue 62 and the outer face 82 of the tongue 50 so as to provide a clearance between those parts. The functions of those clearances will become apparent below.

To secure the several parts of the reel together a quick drying solvent cement 83 is used on the surfaces 64 and 68, while an elastic cement such as an epoxy 85 may be used in the wells 28, 30 and 32 to join the plastic reel flanges and the aluminum hub. The solvent cement which sets very quickly serves to hold the assembly together and allow the epoxy cement to set slowly without any relative shifting of the parts. If the epoxy cement is allowed to set while the parts are in a controlled atmosphere, no relative expansion will occur between the parts to weaken the bond as it is created, and the solvent cement will dry quickly and clamp the various parts together.

It is apparent that relative displacement will occur where the parts of the aluminum hub contact the plastic reel flanges. The epoxy cement in the well 32 will allow the offset portion 58 of the flange 14 to move relative to the hub web 18 while maintaining a bond between those parts. Similarly, an epoxy cement should be used in the wells 28 and 30 to allow relative motion between the flanges 12 and 14 on the one hand and the hub flange 16 on the other, if any cement is used at those locations. No relative movement will occur between the tongues on the separate reel flanges and accordingly the unyielding solvent cement suggested is appropriate. The clearance provided between the inner radial edges 42 and 60 of the reel flanges 12 and 14 and the outer surface of the inner hub flange 15 along with the clearance between the margins of the slot 36 and the facing surfaces of the tongues 50 and 62 and the tongue edges (see FIG. 5) allow the flanges to shift slightly radially or circumferentially with respect to the hub 10 without applying undue stress upon the epoxy cement ribbons used to secure the aluminum to the plastic at the various locations.

From the foregoing description it will be apparent that a reel constructed in accordance with this invention provides a relatively strong aluminum hub 10 which may withstand the forces normally applied to the reel hub without any appreciable distortion. The aluminum has a strength to weight ratio that substantially exceeds the plastic materials heretofore used for reel hubs. Accordingly, the outer machined surface 22 of the hub upon which the tape is wound will remain a true cylinder about the hub axis so that the tape will not wind unevenly on it. The flanges 12 and 14 of the reel made of plastic may be decorative, transparent so as to allow an observer to view the quantity of tape on the reel, and relatively light weight to reduce the mass of the reel. The manner in which the flanges 12 and 14 are secured together assures a solid assembly, and the use of solvent cement at the direct connections between the plastic flanges 12 and 14 serves as a clamp to hold the parts in place while the slow drying epoxy cement sets. While clearance is provided to allow relative shifting of the plastic and aluminum parts, these parts are nevertheless secured together at least at one location by the use of an elastic-type cement. The clearance provided between some of the parts prevents relative expansion from applying excessive forces upon the cement or the parts which could part the bond or crack or distort the plastic.

Figure 6:
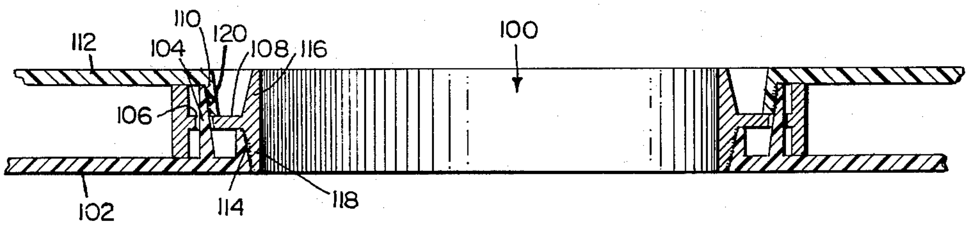
FIG. 6 is an inverted cross-sectional view of another embodiment of this invention.

In FIG. 6 one modification of this invention is shown. Basically, the design of the hub is unchanged and therefore need not be described in detail again. Certain of the details are omitted in FIG. 6 such as the recesses in the ends of the outer hub flange in which a ribbon of cement may be applied to secure the reel flanges to the hub. In the embodiment of FIG. 6 reel flange 102 is provided with tongues 104 which extend through the slots 106 provided in the web 108 of the hub, and the tongues 104 are secured to an inwardly turned rib 110 formed on the inner edge of the other reel flange 112. The reel flange 102 is also provided with a rib 114 which abuts against the outer surface of the inner hub flange 116, and epoxy cement may be applied to those mating parts as suggested at 118. A solvent cement 120 is used to secure the tongue 104 to the rib 110. As in the preferred embodiment of this invention, the slot 106 is provided with clearance about the inner and outer radial faces of the tongues 104 so as to allow for expansion and contraction of the plastic and aluminum parts relative to one another.

In the embodiment of FIG. 6, just as in the preferred embodiment, an epoxy cement is used wherever the aluminum hub is to be bonded to the plastic reel flanges. In those parts of the two flanges which are in contact with one another, a solvent cement is used which serves to hold the various parts together while the solvent cement sets. Further, the two reel flanges are secured directly to one another without covering the critical faces of the inner and outer hub flanges.

From the foregoing description those skilled in the art will appreciate that numerous modifications may be made of this invention without departing from its spirit. Therefore, it is not intended that the breadth of this invention be limited to the two embodiments illustrated and described. Rather, it is intended that the breadth of this invention be determined by the appended claims and their equivalents.

What is claimed is:

1. A reel for storing tape and the like comprising an annular hub made of aluminum in the shape of an I-beam in cross section with the flanges of the I-beam describing inner and outer cylinders connected by the I-beam web,
a plurality of spaced arcuate slots through the web parallel with the I-beam flanges,
a first annular reel flange made of plastic material having an inner diameter substantially equal to the diameter of the inner I-beam flange and secured to that I-beam flange and engaging the other I-beam flange, said annular flange lying in a plane perpendicular to the axes of the cylinders,
a second annular reel flange parallel to the first annular flange and made of plastic material, said second flange engaging the outer I-beam flange and the I-beam web,
a plurality of arcuate tongues carried by at least one of the annular reel flanges on the side facing the web and extending through the arcuate slots,
and a cement on said ribs for holding the annular reel flanges together.

2. A reel comprising
an annular hub made of aluminum in the shape of an I-beam in cross section with the flanges of the I-beam describing inner and outer cylinders connected by the I-beam web,
a plurality of spaced arcuate slots through the web parallel with the I-beam flanges,
a first annular reel flange made of plastic material having an inner diameter substantially equal to the diameter of the inner I-beam flange and secured to that I-beam flange and engaging the other I-beam flange, said annular flange lying in a plane perpendicular to the axes of the cylinders,
a second annular reel flange parallel to the first annular flange and engaging the outer I-beam flange,
a plurality of arcuate tongues secured to the side of the first annular reel flange facing the web and extending through the arcuate slots in the web,
and a solvent cement applied to the tongues and securing the tongues to the second reel flange.

3. A reel as defined in claim 2 further characterized by
a plurality of additional tongues secured to the second annular reel flange and extending through the arcuate slots,
said cement on the tongues securing those ribs to the additional tongues.

4. A reel as defined in claim 1 further characterized by
said slots providing clearance between the tongues and the slot margins to enable the annular flanges to expand and displace relative to the hub.

5. A tape reel comprising
a hub in the shape of an I-beam in cross section and with the I-beam flanges generating parallel cylinders about the reel axis,
and a pair of separately fabricated parallel reel flanges each made of a material different from the material of the hub and connected directly to one another between the I-beam flanges of the hub.

6. A tape reel as defined in claim 5 further characterized by
said hub being made of aluminum and with the outer surface of the outer I-beam flange being machined.

7. A tape reel as defined in claim 6 further characterized by
said reel flanges being made of plastic material.

8. A tape reel comprising
a hub in the shape of an I-beam in cross section and with the I-beam flanges generating parallel cylinders about the reel axis,
a web forming part of the hub and interconnecting the parallel cylinders,
a plurality of openings provided in the web,
a pair of reel flanges mounted on the hub and at least one having means which extend through the openings,
and means directly joining the two reel flanges independent of the hub through the openings.

9. A tape reel as defined in claim 8 further characterized by
at least one of the reel flanges being directly secured to the hub.

10. A tape reel as defined in claim 8 further characterized by
said means on the reel flanges each extending through each of said openings so that the means engage one another,
said openings being larger than the means to allow relative displacement of the means in said openings.

11. A tape reel comprising
a hub made of a relatively light weight metal and having a cylindrical surface directly upon which the tape is to be wound,
an inner surface forming part of the hub and disposed radially inward of the cylindrical surface for supporting the reel on a spindle,
a pair of substantially parallel annular reel flanges made of a plastic material extending over and engaging the edges of the cylindrical surface with the inner edge of each of the flanges disposed radially between the cylindrical and inner surfaces,
and means securing the reel flanges directly together independent of the hub between the cylindrical and inner surfaces.

12. A tape reel as defined in claim 11 further characterized by
means securing at least one of the flanges to the hub being an elastic cement.

13. A tape reel as defined in claim 11 further characterized by
openings provided in the hub and disposed axially between the cylindrical and inner surfaces,
and at least one of the flanges having means integral therewith which extend through the openings and engage the other flange,
said openings being larger than said means to allow for relative displacement between the flange and the hub.

14. A tape reel as defined in claim 13 further characterized by
the inner edge of at least one of said flanges being disposed axially inwardly of the edge of said inner surface on its side of the hubs.

15. A tape reel comprising
a hub in cross section shaped as an I-beam with the two flanges of the I-beam forming parallel cylinders, the inner of the cylinders being adapted to fit on a spindle and the outer of the cylinders being adapted to have tape directly wound upon it,
a web forming part of the hub and interconnecting the hub flanges inwardly of the flange edges,
a first annular reel flange in contact with the one edge of the outer of the hub flanges and having its inner edge disposed between the inner and outer hub flanges,
a plurality of slots in the web,
a plurality of tongues carried by the first reel flange and extending through the slots to the other side of the web,
a second annular reel flange in contact with the other edge of the outer of the hub flanges, said second reel flange having an inner portion lying between the hub flanges,
a step provided adjacent the inner edge of the second reel flange offsetting the inner portion so that it lies in contact with the web,
a plurality of tongues carried by the second reel flange and extending through the slots and in contact with the tongues on the first reel flange,
said slots being larger than the tongues which extend through them to allow the tongues to shift radially and angularly within the slots, a recess provided in the side of the web in contact with the offset portion of the second reel flange, a yieldable cement disposed in the recess for bonding the offset portion to the web, and a cement bonding together the tongues of the two reel flanges in contact with one another.

16. A tape reel comprising, a hub in the shape of an I-beam in cross section and with the I-beam flanges generating parallel cylinders about the reel axis, a web forming part of the hub and interconnecting the parallel cylinders, a plurality of openings extending through the web, a pair of reel flanges with one mounted on each side of the hub and generally perpendicular to the cylinders, tongues forming an integral part of at least one reel flange and extending through the openings in the web and engaging the other reel flange, a solvent cement securing the tongues to the other reel flange, and elastic means joining at least one of the reel flanges to the hub.

References Cited by the Examiner

UNITED STATES PATENTS

| | | | |
|---|---|---|---|
| 1,858,586 | 5/1932 | Goldberg et al. | 242—71.8 |
| 3,088,689 | 5/1963 | Perlini | 242—71.8 |

MERVIN STEIN, *Primary Examiner.*

N. L. MINTZ, *Assistant Examiner.*